United States Patent [19]

Herdzina, Jr.

[11] 4,005,960
[45] Feb. 1, 1977

[54] APPARATUS FOR APPLYING PLASTIC TO A PLANAR SURFACE

[75] Inventor: Frank John Herdzina, Jr., Schaumburg, Ill.

[73] Assignee: American Can Company, Greenwich, Conn.

[22] Filed: Oct. 14, 1975

[21] Appl. No.: 622,225

Related U.S. Application Data

[62] Division of Ser. No. 401,143, Sept. 27, 1973.

[52] U.S. Cl. .............................. 425/113; 222/255; 425/287; 425/382 R; 425/464; 425/809; 425/DIG. 224; 425/DIG. 229
[51] Int. Cl.² ........................................ B29C 13/02
[58] Field of Search .......... 425/382, 461, 463, 464, 425/809, DIG. 47, DIG. 224, DIG. 229, 245 R, 113, 287; 222/276, 255

[56] References Cited

UNITED STATES PATENTS

| | | | |
|---|---|---|---|
| 2,279,380 | 4/1942 | Reid | 425/DIG. 229 |
| 2,770,011 | 11/1956 | Kelly | 425/DIG. 229 |
| 2,771,225 | 11/1956 | Perkins | 222/255 |
| 2,965,932 | 12/1960 | Knowles | 264/251 |
| 3,241,191 | 3/1966 | Nouel | 425/245 |
| 3,343,211 | 9/1967 | Strickman | 425/287 |
| 3,719,441 | 3/1973 | Spaak et al. | 425/245 |
| 3,787,159 | 1/1974 | Bielfeldt | 425/245 |

Primary Examiner—Robert L. Spicer, Jr.
Attorney, Agent, or Firm—Robert P. Auber; Ernestine C. Bartlett; Ira S. Dorman

[57] ABSTRACT

An improvement in a method of applying plastic to a planar surface which comprises extruding the plastic through an annular orifice as a ring onto the planar surface. The improvement is particularly helpful in the manufacture of push button ends for beverage cans.

8 Claims, 6 Drawing Figures

APPARATUS FOR APPLYING PLASTIC TO A PLANAR SURFACE

This is a division of application Ser. No. 401,143, filed Sept. 27, 1973.

BACKGROUND OF THE INVENTION

The instant invention relates to the application of plastic to a planar surface, and more particularly to the application of plastisol to holes pierced in a metal beverage can end surface.

There are beginning to appear in the marketplace today various types of metal ends for beer and beverage cans having segments therein completely pierced to provide a venting and/or pouring aperture. A plastic, herein broadly defined to include plastisols, rubber based sealing compounds and hot melts, is then applied to the underside of the end to seal the end. One such type of end is the so-called "push button" end depicted in U.S. Pat. No. D 226,171, issued Jan. 30, 1973. Heretofore, the plastic has been applied to the pierced holes by means of extruding the plastic through a nozzle in a single stream and directing the plastic over the segment to be repaired. It is apparent that great simplification of equipment can result from applying the plastisol in one operation which does not require the generation of motion in the nozzle to achieve the desired pattern of plastic. Since the pattern itself is extruded, problems of accuracy and reliability are greatly reduced with the instant invention so that production delays are minimized.

SUMMARY OF THE INVENTION

The instant invention provides an improvement in the method of applying plastic to a planar surface. The improvement comprises extruding the plastic through a substantially annular orifice as a ring-like pattern onto the planar surface, whereby contact between the planar surface and all points of the plastic pattern is effected substantially simultaneously.

DESCRIPTION OF THE PREFERRED EMBODIMENT

Figure 1:
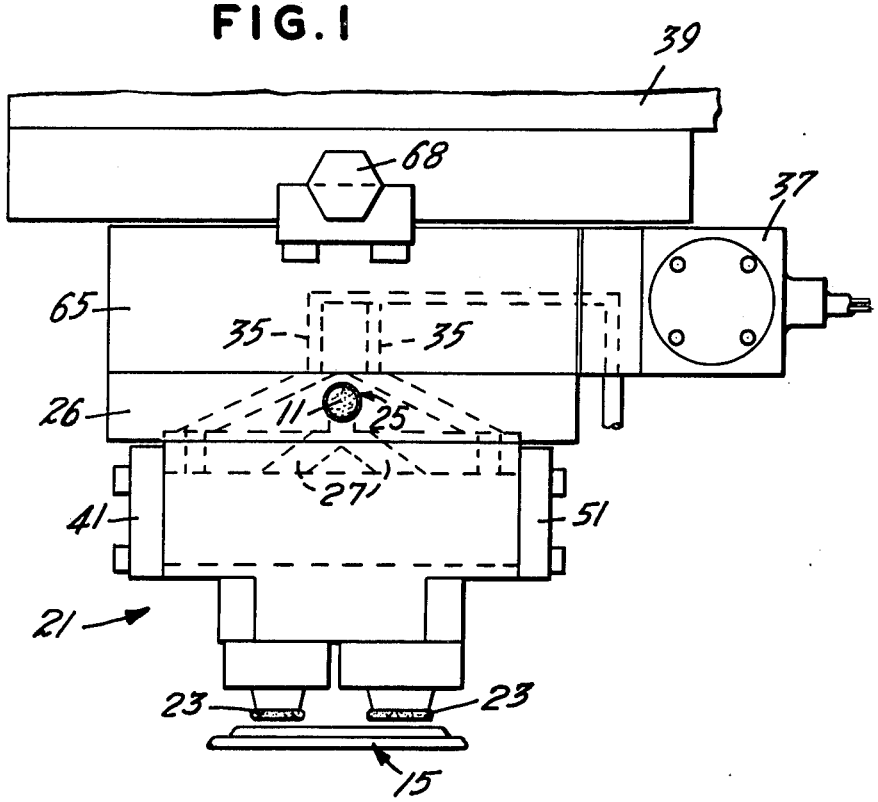
FIG. 1 is a front elevational view of apparatus used in the instant invention prior to plastic being applied to an upside down can end.
Figure 2:
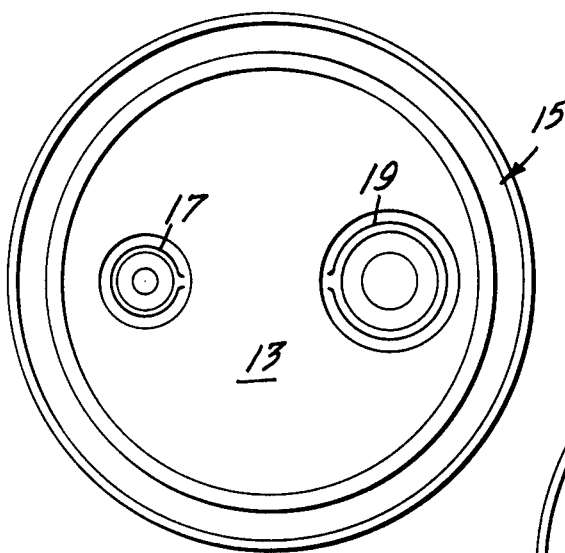
FIG. 2 is an enlarged, top plan view of a push button end which receives plastic from the apparatus of FIG. 1.
Figure 3:
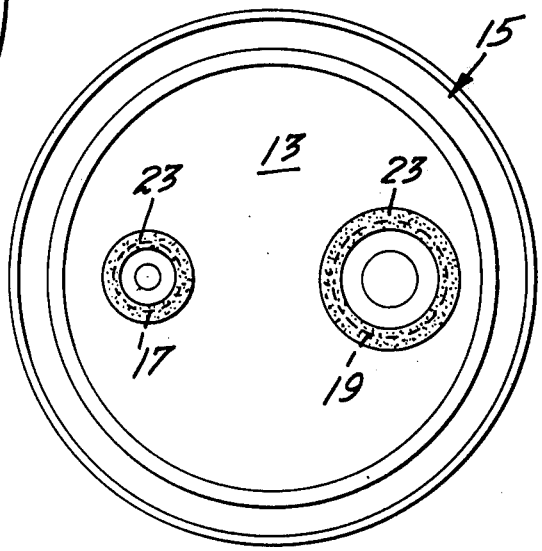
FIG. 3 is an enlarged, bottom plan view of the push button end shown in FIG. 2 after the plastic has been applied to the pierced metal defining the pouring and venting apertures of the end.

In the preferred embodiment of the instant invention, plastisol 11 is applied as a ring 23 to the underside 13 of a push button can end 15 along two paths of pierced metal which define the venting aperture 17 and the pouring aperture 19. The end 15 is positioned upside down beneath an applicator 21 (see FIG. 1).

In order to deposit the rings 23 of plastisol 11 upon the can end 15, a plastisol applicator 21 is connected into a circulatory system (not shown) that controls pressure and temperature of the plastisol material. Plastisol 11 is pumped into the system from a supply tank through a filter to an accumulator to smooth out pump pulsations. The plastisol 11 is then passed through a thermostatically controlled heater to a pressure regulator. Further smoothing out of pulses in the system is provided by an additional accumulator. The plastisol 11 is then fed into the applicator 21 by means of flexible tubes which are used because the applicator 21 is attached to a movable ram 39 of a press (not shown). The applicator 21 deposits the plastisol rings 23 to the underside 13 of the end 15 and allows excess plastisol 11 to continue on through a back pressure regulator to complete the circuit.

Figure 4:
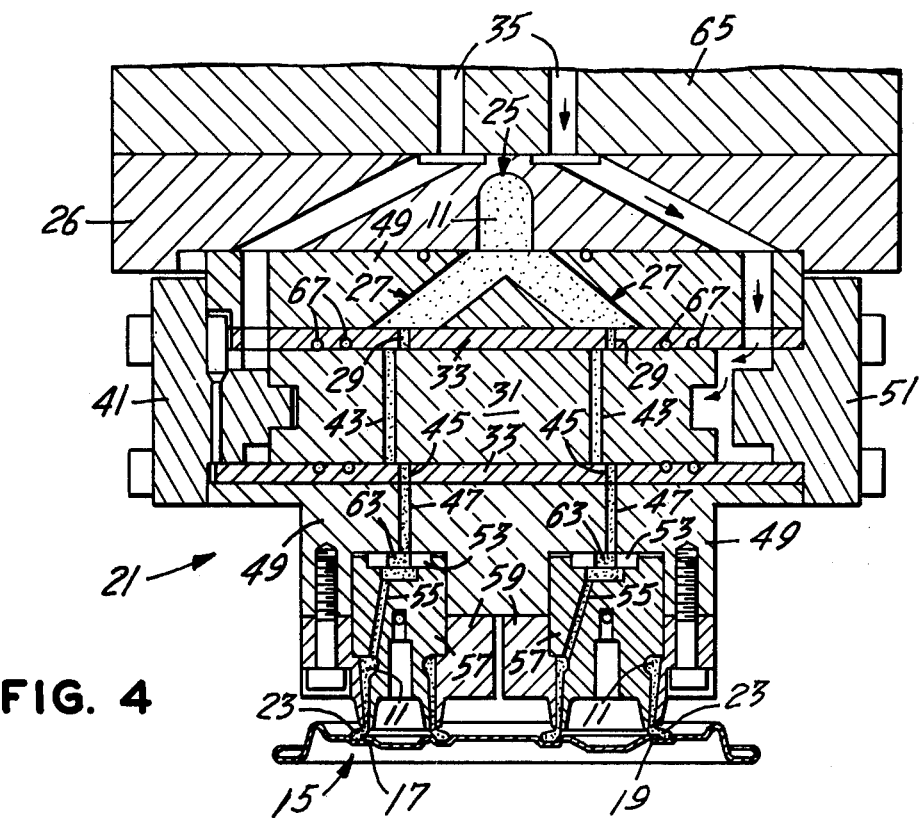
FIG. 4 is a central, vertical sectional view of the apparatus shown in FIG. 1 as the plastic is being applied to the end.
Figure 5:
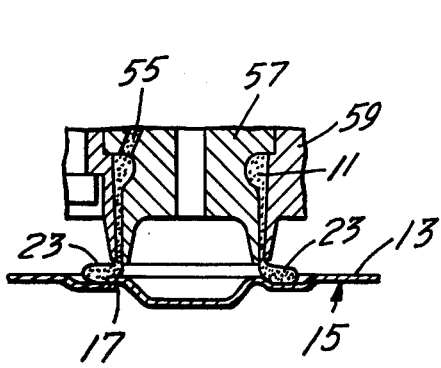
FIG. 5 is an enlarged, vertical sectional view showing the plastic being extruded through the nozzle assembly and sealing the venting aperture.

Reference is now made to FIGS. 1 and 4 in describing the operation of the plastisol applicator 21. The heated plastisol 11 is fed under pressure through a port 25 in a manifold 26 and into two pairs of connecting channels 27 and 29 until it is stopped by a valve spool 31 (shown in off position) housed within a sleeve 33. Surplus plastisol 11 is allowed to continue through the manifold 26 and eventually is returned to the supply tank (not shown).

The valve spool 31 is activated to an on position by air pressure entering ports 35 from an electronic solenoid pilot valve 37 (see FIG. 1) which is triggered by a signal related to the moving ram 39. Positioning of the valve spool 31 in the off position (as shown in FIG. 4), is governed by a long end cap 41. To allow the pressurized plastisol 11 to continue through the pair of channels 43 within the valve spool 31 and into the pair of channels 45 located in the lower portion of the valve sleeve 33 and into the pair of channels 47 located in the nozzle housing 49, the spool 31 moves to the right of the position shown in FIG. 4, stopping against the short end cap 51. The four pairs of channels 29, 43, 45 and 47 thereby become axially aligned to permit the pressurized plastisol 11 to flow through control plates 53 and into a pair of ports 55. Thereafter the plastisol 11 emerges as two rings 23 through the annular orifices formed by the clearance between the outer diameter of the internal nozzles 57 and the inner diameter of the external nozzles 59. Shutoff is effected by air entering the port 35 from the control solenoid pilot valve.

Flow control of the plastisol 11 is adjusted by means of the plates 53 which are keyed to the internal nozzle 57. When this assembly is rotated, for the purpose of adjusting plastisol flow, a slot 63 in the plate 53 and the channel 47 in the nozzle housing 49 are moved out of parallel alignment to produce a throttling effect.

Precise positioning of the nozzle tips relative to the end 15 is provided by a wedge-type mount 65 which is equipped with a micrometer adjustment 68. This feature permits compensation for variance in individual runs of ends or plate response in conversion.

The valve sleeve 33 is equipped with two scavenging grooves 67 at either end to catch escaping plastisol 11 or air, and vent the same to the atmosphere. This feature prevents air from contaminating the plastisol 11 and creating air bubbles or poor laydown which could cause leaks in the can end 15. It also eliminates plastisol 11 that works its way between the spool 31 and the sleeve 33 that would slow up the response of the valve spool 31.

The response and life of the valve sleeve and spool assembly are dependent upon the geometric accuracy of the two parts and the material of which they are made. The sleeve 33 is preferably made of a carbide honed to a roundness accuracy of 0.00005 and a surface finish of about 1–4 micro inches. The matching spool 31 is preferably ceramic-coated aluminum matching the carbide sleeve 33 in roundness and finish specification.

Figure 6:
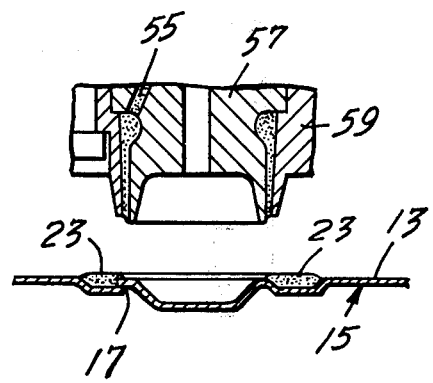
FIG. 6 is the same as FIG. 5 except it shows the extrusion nozzle assembly moving upward and away from the venting aperture of the end after the plastic has been applied thereto.

In operation, the ram 39 lowers the applicator 21 to the position shown in FIG. 4 adjacent the underside 13 of the can end 15 having the apertures 17 and 19 aligned with the nozzle assemblies. For most of the downward stroke, the valve spool 31 is in the closed position. As the applicator 21 approaches the end 15, the valve spool 31 is opened by the air valve 37 and remains open as the applicator 21 completes the downward stroke. As the ram 39 begins to move the applicator 21 on its upward stroke, the valve spool 31 becomes closed again. It can therefore be seen that FIG. 4 depicts the applicator 21 at the very start of its upward stroke after application of the plastisol 11 to the end 15. FIG. 6 depicts the nozzle assembly removed from the end 15 with the plastisol 11 within the nozzle assembly separated from the plastisol rings 23 on the end 15. The separation of plastisol 11 occurs at the moment when the adhesive forces between the end 15 and the plastisol ring 23 exceed the cohesive forces within the plastisol 11. It is estimated that the valve spool 31 is open only for about the lower 10% of the stroke of the applicator 21.

It should be noted that the invention is applicable to the application of plastic in any pattern form, not merely the ring-like patterns set forth above, and that the plastic can be extruded upward to the planar surface, as well as downward.

It is thought that the invention and many of its attendant advantages will be understood from the foregoing description and it will be apparent that various changes may be made in the steps of the process described and their order of accomplishment without departing from the spirit and the scope of the invention or sacrificing all of its material advantages, the process hereinbefore described being merely a preferred embodiment thereof.

What is claimed is:

1. An applicator for applying plastic to a planar surface comprising:
    a housing comprising a pair of nozzle assemblies, each containing an annular orifice and a channel through which plastic is conveyed to the orifice;
    means for supplying plastic to the assemblies comprising a pair of connecting channels;
    a valve sleeve positioned between the plastic supply and nozzles comprising a plurality of paired connecting channels in axial alignment with the nozzle and plastic supply channels and having fixed end members, said sleeve housing a spool having paired connecting channels in axial alignment with the valve sleeve channels, said spool being movable to a position of non-alignment relative to the aligned channels of the sleeve;
    means for effecting movement of the channeled spool to a position of non-alignment or alignment relative to said sleeve channels comprising an electronic solenoid pilot valve and ports conducting pressurized air to said spool; and
    means for effecting movement of the applicator toward and away from said planar surface.

2. An applicator as defined in claim 1 wherein the paired channels of the nozzle, supply means and valve sleeve are in vertical alignment.

3. An applicator as defined in claim 1 wherein said spool is in a position of non-alignment as the assembly moves away from said planar surface.

4. An applicator as defined in claim 1 wherein said valve sleeve also comprises means for removing excess plastisol and air.

5. An applicator as defined in claim 1 in which the nozzle assembly additionally comprises means for adjusting flow of the plastic to the nozzle.

6. An applicator as defined in claim 1 in which the applicator is capable of vertical movement.

7. An applicator for applying a plastisol to pierced areas defining vent and pour apertures in a metal can end comprising:
    housing comprising a pair of nozzle assemblies each having an annular orifice and a channel through which plastisol is conveyed to the orifice;
    means for feeding plastisol to the assemblies including a manifold having a pair of connecting channels;
    a carbide valve sleeve, positioned between the manifold and nozzle housing, comprising a pair of connecting channels in axial alignment with the paired channels of the nozzle housing and the manifold;
    a ceramic-coated aluminum spool, housed in said valve sleeve, having a pair of connecting channels in axial alignment with the valve sleeve channels, said spool being laterally movable to a position of non-alignment relative to the aligned channels of the sleeve;
    means for effecting lateral movement of the spool to a position of non-alignment or alignment relative to said channeled sleeve comprising an electronic solenoid pilot valve and ports conducting pressurized air to said spool; and
    means for effecting vertical movement of the applicator relative to the can end.

8. An applicator for applying plastic to a planar surface comprising: A housing comprising a pair of nozzle assemblies, each containing an annular orifice and a channel through which plastic is conveyed to the orifice;
    means for supplying plastic to the assemblies comprising a pair of connecting channels;
    a valve sleeve having fixed end members and positioned between the plastic supply and nozzles, said sleeve comprising a plurality of paired connecting channels in axial alignment with the nozzle and plastic supply channels and including means for removing excess plastic and air, said sleeve housing a spool having paired connecting channels in axial alignment with the valve sleeve channels, said spool being movable to a position of non-alignment relative to the aligned channels of the sleeve;
    means for effecting movement of the channeled spool to a position of non-alignment or alignment relative to said sleeve channels; and
    means for effecting movement of the applicator toward and away from said planar surface.

* * * * *